United States Patent
Hedman

(10) Patent No.: US 6,929,097 B2
(45) Date of Patent: Aug. 16, 2005

(54) LUBRICATION DEVICE FOR STAGE-GEARED GEARBOX

(75) Inventor: Anders Hedman, Marstrand (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/710,953

(22) Filed: Aug. 13, 2004

(65) Prior Publication Data

US 2005/0011705 A1 Jan. 20, 2005

Related U.S. Application Data

(63) Continuation of application No. PCT/SE03/00196, filed on Feb. 5, 2003.

(30) Foreign Application Priority Data

Feb. 14, 2002 (SE) .............................................. 0200440

(51) Int. Cl.⁷ .............................................. F01M 11/00
(52) U.S. Cl. ........................ 184/6.28; 184/26; 184/27.1
(58) Field of Search ........................ 184/6.28, 26, 27.1, 184/31, 6.5

(56) References Cited

U.S. PATENT DOCUMENTS

| | | | |
|---|---|---|---|
| 3,888,227 A | * | 6/1975 | Green et al. ............. 123/196 R |
| 3,929,117 A | * | 12/1975 | Green et al. ............. 123/196 R |
| 4,356,889 A | * | 11/1982 | Teeter ........................ 184/6.12 |
| 5,052,355 A | * | 10/1991 | Ito et al. ................. 123/196 R |
| 5,158,152 A | | 10/1992 | Nemoto et al. |
| 5,279,391 A | * | 1/1994 | Ward .......................... 184/6.12 |
| 6,026,698 A | | 2/2000 | Weston |
| 6,044,931 A | * | 4/2000 | Reed et al. ................ 184/6.12 |
| 6,189,655 B1 | | 2/2001 | Scheib et al. |
| 6,227,333 B1 | | 5/2001 | Scheib et al. |
| 6,631,651 B2 | * | 10/2003 | Petrzik ........................ 74/346 |
| 6,779,965 B2 | * | 8/2004 | Pessin et al. .................. 415/1 |
| 2003/0101960 A1 | * | 6/2003 | Tsuchiya et al. ........ 123/196 R |

FOREIGN PATENT DOCUMENTS

JP 62-292530 * 12/1987

* cited by examiner

Primary Examiner—David M. Fenstermacher
(74) Attorney, Agent, or Firm—Novak Druce & Quigg, LLP

(57) ABSTRACT

An arrangement for providing a lubrication device for a stage-geared gearbox (1, 2) arranged in a motor vehicle. The gearbox (1, 2) has an input shaft (4), intermediate shaft (5), which has at least one gear meshing with a gear on the input shaft (4). A main shaft (6) is provided with gears (7, 8, 9, 10) which mesh with gears on the intermediate shaft. One gear (11, 18) on both the intermediate shaft (5) and the main shaft (6) are for reverse. A reverse gear shaft (20) is supported in the casing (16, 21) and in a reverse gear shaft lug (22), the reverse gear shaft lug in turn being fixed in the casing (16). A reverse intermediate gear (19) is arranged on the reverse gear shaft (20) between the reverse gear shaft lug (22) and the bearing point for the reverse gear shaft in the casing (21). The reverse intermediate gear (19) meshes with the two corresponding gears (11, 18) for reverse gears. The lubrication device includes a lubricant pump (24) that is arranged between bearing points (16, 21, 22) of the reverse gear shaft (20). An oil filter (28) is arranged in the cover (54).

9 Claims, 11 Drawing Sheets

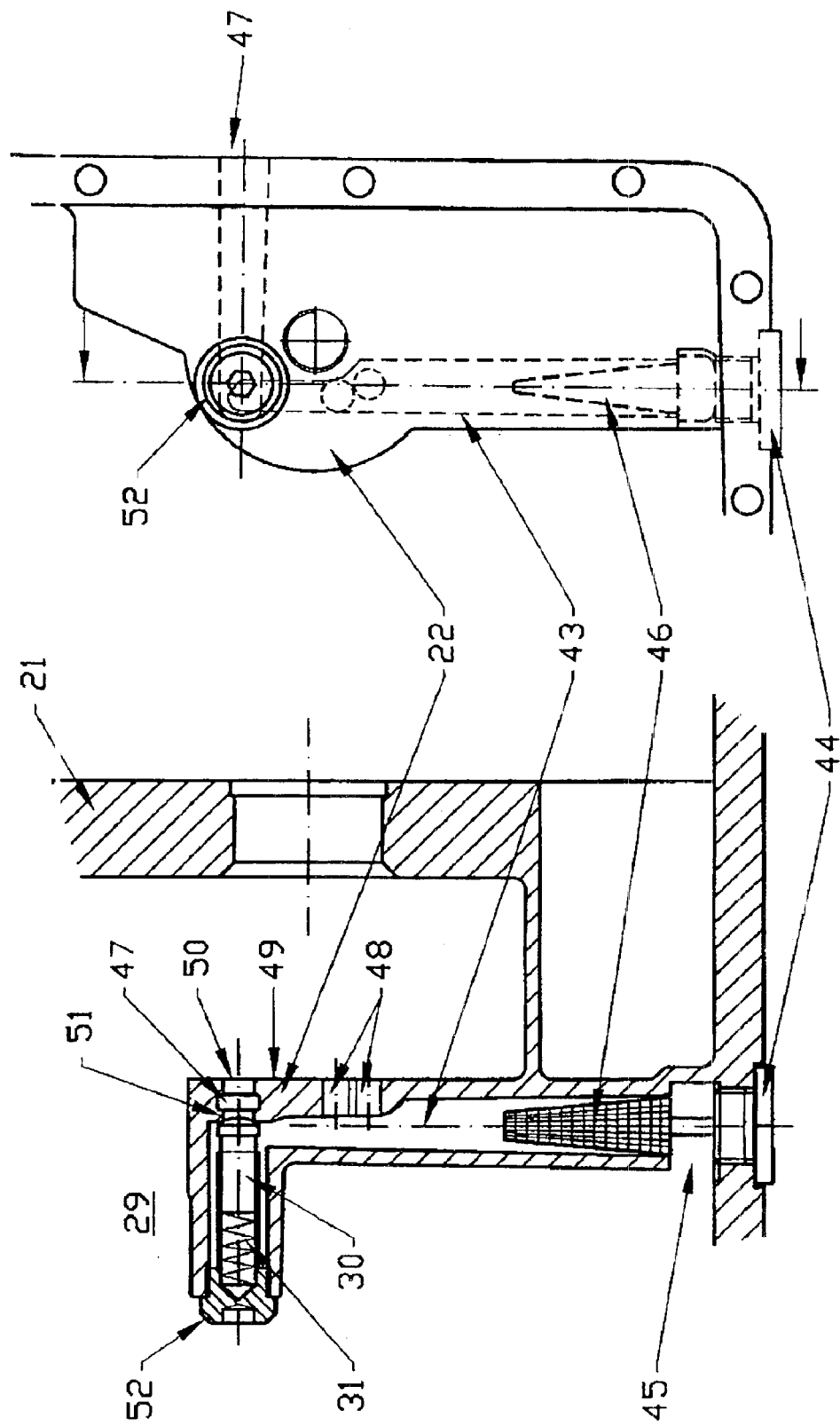

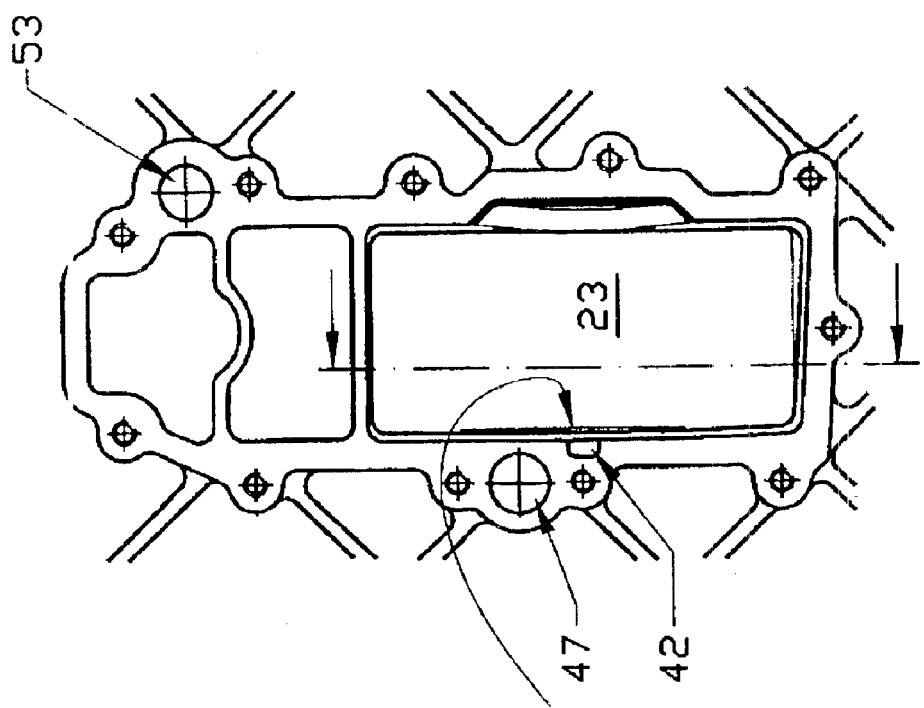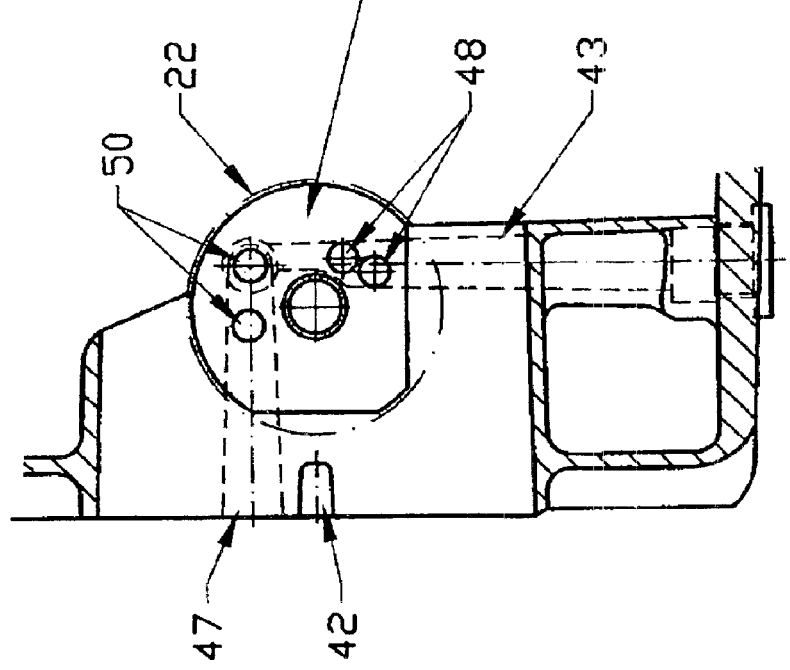

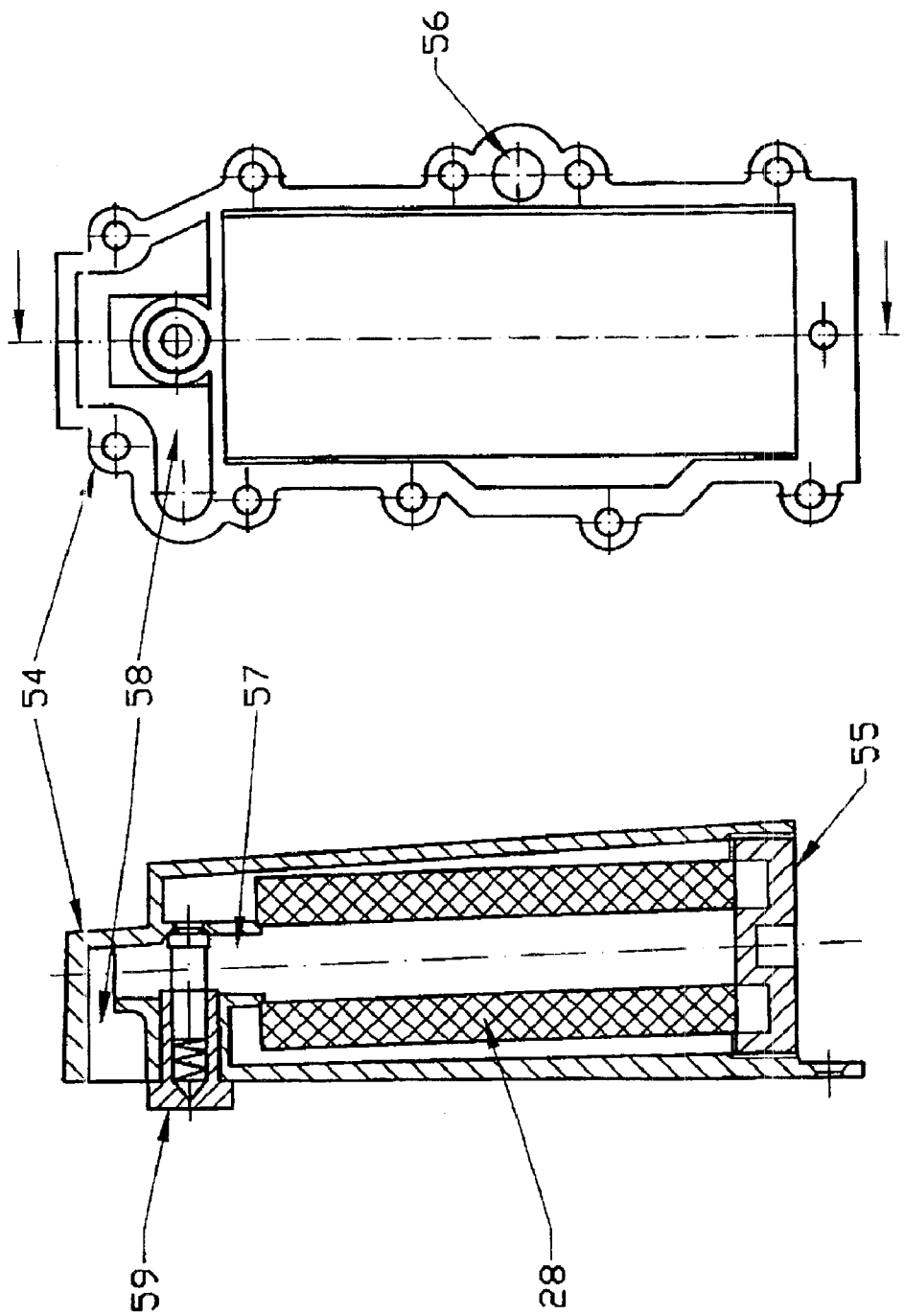

LUBRICATION DEVICE FOR STAGE-GEARED GEARBOX

CROSS-REFERENCE TO RELATED APPLICATIONS

The present application is a continuation patent application of International Application No. PCT/SE03/00196 filed 5 Feb. 2003 which was published in English pursuant to Article 21(2) of the Patent Cooperation Treaty, and which claims priority to Swedish Application No. 0200440-6 filed 14 Feb. 20025. Said applications are expressly incorporated herein by reference in their entireties.

TECHNICAL FIELD

The present invention relates to a device for delivering lubricating oil in a gearbox, which is arranged in a motor vehicle.

BACKGROUND ART

FIG. 1 shows a longitudinal section through a known configuration for a manually shifted gearbox 1 for a truck. The front parts of the gearbox are shown to the left in FIG. 1, which is to say, towards the vehicle engine. The rear parts of the gearbox are shown to the right in FIG. 1. The gearbox comprises (includes, but is not necessarily limited to) a basic gearbox 2, having a plurality of (multiple) possible gear ratios, and an auxiliary gearbox, commonly referred to as a range-change gearbox 3. The range-change gearbox 3 has a gear with a high gear ratio and a gear with no gear ratio; that is to say, a direct transmission configuration. The range-change gearbox 3 essentially doubles the number of gears provided by the basic gearbox.

The basic gearbox 2 shown in FIG. 1 comprises an input shaft 4, an intermediate shaft 5 and a main shaft 6. The latter is provided with a number of gears supported on bearings, so-called runners 7, 8, 9, 10 and 11. These can be rotationally locked to the main shaft by means of toothed clutch devices 12, 13 and 14. Corresponding gears on the intermediate shaft 5 are very often incorporated into the intermediate shaft 5 and are then referred to as racks. The toothed clutch devices can be synchronized or unsynchronized. In FIG. 1, the toothed clutch devices 12 and 13 are synchronized and the toothed clutch device 14 is unsynchronized. An unsynchronized toothed clutch device is generally significantly shorter in its radial extent than one that is synchronized. According to the example shown in FIG. 1, the transmission casing comprises a clutch cover 15, a basic transmission casing 16 and a range transmission casing 17.

Normally, at least one of the runners on the main shaft is used for reverse gears. With reverse gear engaged, the main shaft must have the opposite direction of rotation compared to when a forwards gear is engaged. As illustrated in FIG. 1, this is commonly achieved by one runner 11 not meshing with the opposite rack 18 on the intermediate shaft 5. Instead, an intermediate gear, a so-called reverse intermediate gear 19, is arranged above the plane shown in FIG. 1 (the reverse intermediate gear is therefore not visible in FIG. 1). FIG. 2b demonstrates this principle. In FIG. 2b, the gears 11, 18, 19 are shown as viewed from the left-hand side of FIG. 1 (i.e. from the front). FIG. 2a shows the corresponding principle for the forward gears (that is 7, 8, 9, 10 in FIG. 1). It must be noted that the runner 11 for reverse gears is coupled to the main shaft 6 by means of the unsynchronized toothed clutch 14 (see FIG. 1). Between the runners 10, 11 and the intermediate shaft 5, there is a relatively large amount of space around the intermediate shaft 5. This is because the toothed clutch 14, with its clutch fork 14a, requires space between the gears 10 and 11.

The same gearbox as in FIG. 1 is shown in a partially cut-away, three-dimensional perspective view in FIG. 3. In FIG. 3, it is possible to see the reverse intermediate gear 19, which is rotatably supported on a reverse gear shaft 20. The reverse gear shaft 20 is in turn fixed partly in the wall 21 of the basic transmission casing 16 and partly in an integrally cast projection also commonly referred to as a reverse gear shaft lug 22 (see FIGS. 1 and 3).

FIGS. 4a and 4b show an embodiment of the basic transmission casing 16 from a gearbox 1 such as illustrated in FIG. 1. FIG. 4a shows a side view of the casing 16, and FIG. 4b shows a view from the front which corresponds to being from the left in FIG. 1. Known cost-effective casting methods, such as pressure die casting, make it advantageous to design the basic transmission casing 16 with an opening 23 (see FIG. 4a) in one side wall thereof where the reverse intermediate gear 19 is arranged immediately inside the opening 23. The part of the reverse gear shaft lug 22 pointing towards the reverse intermediate gear 19 can thereby be formed by the casting of a die-cast part which is inserted into the opening 23. In an assembled gearbox 1, the opening 23 is covered by a cover.

The use of a so-called forced-feed lubricating oil system in order to increase the service life of gearboxes for heavy trucks and buses is already known. An example of a known lubricating oil system is shown in FIG. 3. This usually comprises an oil pump 24, which among other things, supplies bearings in the gearbox 1 with an oil flow for lubrication and cooling. The oil pump 24 may be located and driven in various ways. Three known and commonly encountered locations include: (1) The oil pump 24 can be arranged at the front end of the intermediate shaft 5. An example of an oil pump 24 located at the front end of an intermediate shaft 5 is shown in FIG. 5. Since the greater part of the oil flow must be delivered to the range transmission 3 (in the rear part of the gearbox 1), it is inconvenient to have the oil pump 24 arranged in the front part of the gearbox 1. Furthermore, this location can result in a shortage of space since the oil pump 24, a control 26 for the clutch and, in automatic gearboxes, a so-called gearbox brake must share the space in the front part of the gearbox. (2) The oil pump 24 can also be arranged at the rear end of the intermediate shaft 5; that is to say, on the right-hand side of the intermediate shaft 5 (the location not being shown in the Figures). In this configuration, the oil pump 24 is more centrally located at the rear end of the intermediate shaft; i.e., closer to the consumers of the oil flow. Unfortunately, however, such a location means that the range transmission 3 must out of necessity be shifted rearwards, with the result that the gearbox 1 as a whole becomes longer. (3) The oil pump 24 can be arranged at the rear end of the reverse gear shaft 20 (see the example of FIG. 3), driven by a separate shaft, and which is arranged coaxially inside, and passing through the reverse gear shaft 20. A gear 25, which meshes with one of the racks on the intermediate shaft 5 for driving the pump 24, is rotationally fixed to the separate shaft at the front end. The length of the gearbox need not be affected if the oil pump 24 is located at the rear end of the reverse gear shaft 20. The range transmission 3 can, however, find limited space in a radial direction. The oil pump 24 may also be in the way of any additional brake, for example, a retarder, which is often incorporated in the range transmission casing 17. Moreover the separate drive with separate shaft and separate gear 25 is relatively costly.

Furthermore, the oil pump 24 should draw oil as far away as possible from the walls (the front wall, rear wall 21 and the two side walls) in the basic transmission casing 16, and as far down as possible. This ensures that the oil pump 24 does not draw in air even if the vehicle is inclined in any direction. This also means that a separate line 27 (see FIG. 1), often referred to as a suction pipe, has to be used in connection with the aforementioned locations of the oil pump 24.

In order to protect the oil pump 24 from larger particles in the oil, the suction pipe 27 is often provided with a mesh, or so-called suction strainer, arranged at the inlet to the suction pipe 27. In order to increase the service life of the gearbox and to minimize the number of oil changes, the lubrication system is usually provided with an oil filter 28 (see, for example, FIG. 3). This is usually arranged so that the oil flow from the pump 24 passes through the filter 28 on the way to the lubrication points.

At low temperatures, the oil is viscous. A forced-feed oil flow can then give rise to very high oil pressures. In order to prevent damage to and loss of constituent parts and/or major leakage, the lubrication system is often provided with a pressure-limiting valve, which in FIGS. 6a, 6b and 6c is generally denoted by 29. The function of such a valve is shown in a simplified form in FIGS. 6a, 6b and 6c.

A cone 30 is pressed against a seat 60 by means of a spring 31. FIG. 6a shows the valve 29 at normal pressure. The valve 29 is closed and all lubricating oil is led directly from the pump to the lubrication points. The arrow 61 symbolizes the oil flow from the oil pump towards the lubrication points. At a certain oil pressure the spring 31 is no longer capable of pressing the cone 30 against the seat 60. The valve 29 is opened and a part of the oil flow is then passed through the valve 29 (see FIG. 6b and flow arrows 63). The flow to the lubrication points is then less than normal (see flow arrow 62). The pressure in the bypass oil falls when it passes the gap between the cone 30 and the seat 60. This produces a temperature rise, which makes the lubricating oil more thin-bodied. It is then advantageous to return this part of the oil flow to the inlet side of the oil pump 24 (see FIG. 6c and flow arrow 64). The oil flow 65 coming from the pump 24 then becomes more thin-bodied. The oil pressure gradually falls and the pressure-limiting valve 29 is closed. This occurs more rapidly than if the bypass flow through the valve 29 were not returned to the inlet of the pump 24. Return directly to the oil pump therefore means that maximum oil flow 66 to the lubrication points is achieved after a shorter time.

There is thus a need for a better designed lubrication system in a gearbox of the aforementioned type, and in which the aforementioned disadvantages are mitigated or eliminated.

DISCLOSURE

A device, configured according to the teachings of the present invention, takes the form of a lubrication device for a stage-geared gearbox arranged in a motor vehicle. The gearbox has an input shaft, an intermediate shaft that is supported in a casing and has at least one-gear meshing with a gear on the input shaft. A main shaft is supported in the casing and has gears which mesh in gears on the intermediate shaft. At least one gear in each pair of inter-meshing gears on the intermediate shaft and the main shaft are rotatably supported on its shaft and lockable to its shaft by means of clutch members. At least one gear on both the intermediate shaft and the main shaft is for reverse gears. A reverse gear shaft is supported in at least two bearing points in the casing (21, 22). A reverse intermediate gear is arranged on the reverse gear shaft between the bearing points, the reverse intermediate gear meshing with the two corresponding gears for reverse gears. The lubrication device comprises a lubricant pump and the device is by the fact that-the lubricant pump (24) is arranged between the said bearing points for the reverse gear shaft.

A primary advantage of the device is the fact that it allows the lubricant pump to be located more centrally in the gearbox, which gives a shorter distance to lubricant consumers in the gearbox, especially if the gearbox comprises a range transmission. Furthermore, if a range transmission is arranged at the back of the gearbox, the lubrication device will not be in the way of the range transmission.

According to an advantageous first embodiment of the inventive device, a first duct for delivering lubricant to the lubricant pump, a second duct for taking lubricant from the lubricant pump, and a suction duct with suction strainer are arranged in a reverse gear shaft lug, the suction duct being connected to the first duct.

The advantage to this arrangement is that the first duct, which is the inlet duct to the pump, can be located as far away as possible from all walls in the casing while a separate component in the form of a suction pipe, as described above, can be eliminated.

According to an advantageous second embodiment of the device configured according to the invention, the wall of the casing has an opening in connection with the lubricant pump and the reverse intermediate gear. The opening is covered by a cover, and in which are arranged a lubricant filter, a third duct for delivering lubricant to the lubricant filter, and a fourth duct for taking lubricant from the lubricant filter.

The advantage to this is that there is no risk of the lubricant device restricting any range transmission in a radial direction or getting in the way of any additional brake, such as a retarder, incorporated into the range transmission casing. Furthermore, since the oil is led outside the actual basic transmission casing, it will be exposed to a cooling effect from the passing air flow when the vehicle is in motion. This is, advantageous with regard to the life of the gearbox. With the oil filter arranged in the cover, a large cooling surface is obtained.

DESCRIPTION OF DRAWINGS

The present invention will be described in more detail below with reference to the attached drawings, which by way of example show preferred embodiments of the invention, and in which:

FIG. 4a is a longitudinal section through an embodiment of the basic transmission casing for the gearbox according to FIG. 1;

FIG. 4b is a front end view of the basic transmission casing of FIG. 4a;

FIGS. 9a and 9b are a longitudinal section and a front view, respectively, of an embodiment of the invention with ducts, pressure limiting valve and suction strainer incorporated into the reverse gear shaft lug;

FIG. 10a is a cross-sectional rear view through the embodiment of FIGS. 9a and 9b;

FIG. 10b is a side view of an embodiment of the invention having an opening accommodated in the gearbox casing in connection with the reverse intermediate gear and the oil pump;

FIG. 11a is a cross-sectional view taken through an embodiment of the invention with oil filter, ducts and overflow valve built into the cover; and FIG. 11b is an exterior view of the cover of FIG. 11a, viewed from the gearbox.

MODE FOR INVENTION

A lubrication device configured according to the present invention is described hereinbelow in greater detail with reference to FIGS. 7 through 11.

Figure 7:
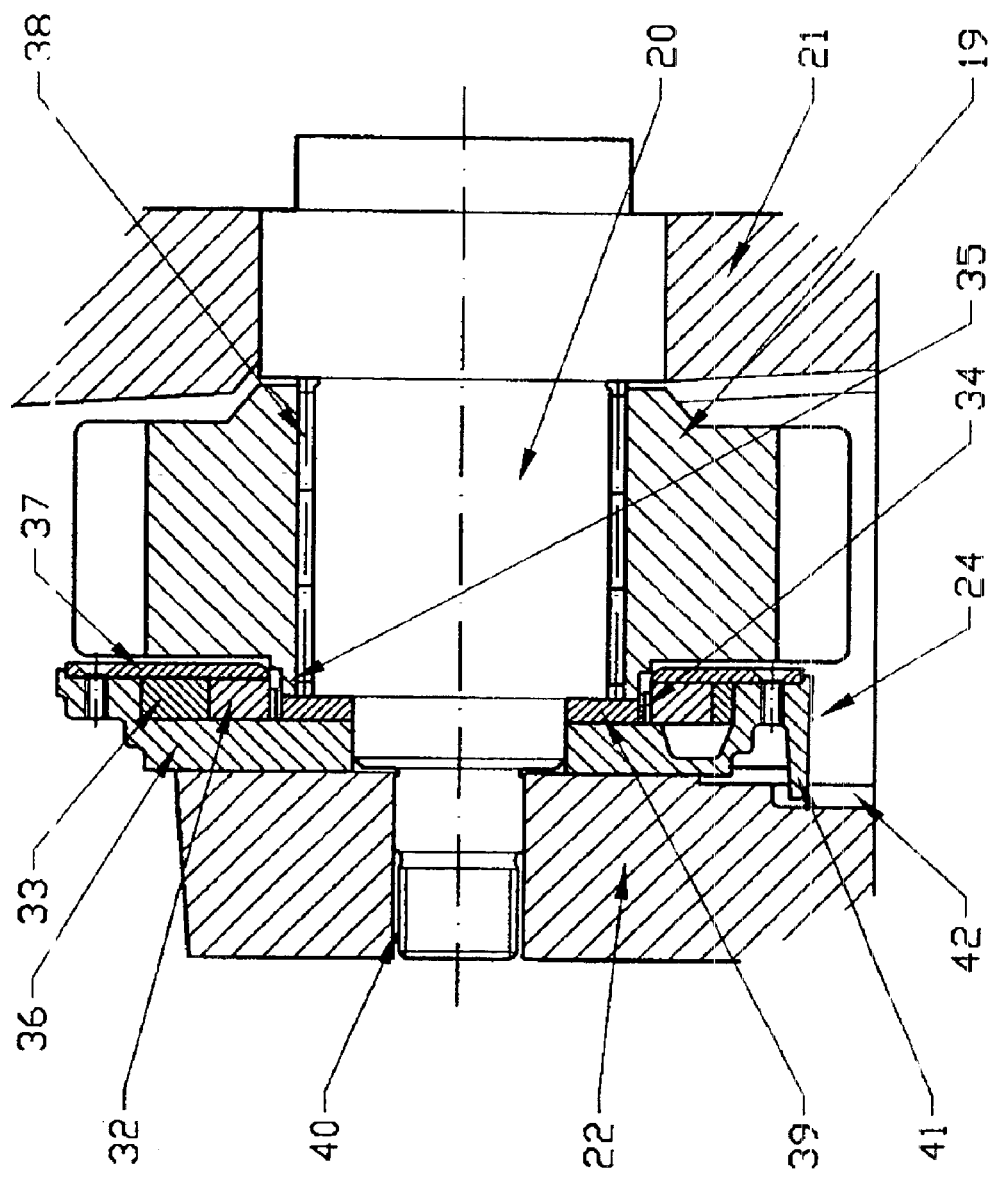
FIG. 7 is a cross-sectional view of an embodiment of the invention with an oil pump of the geared type.
Figure 8:
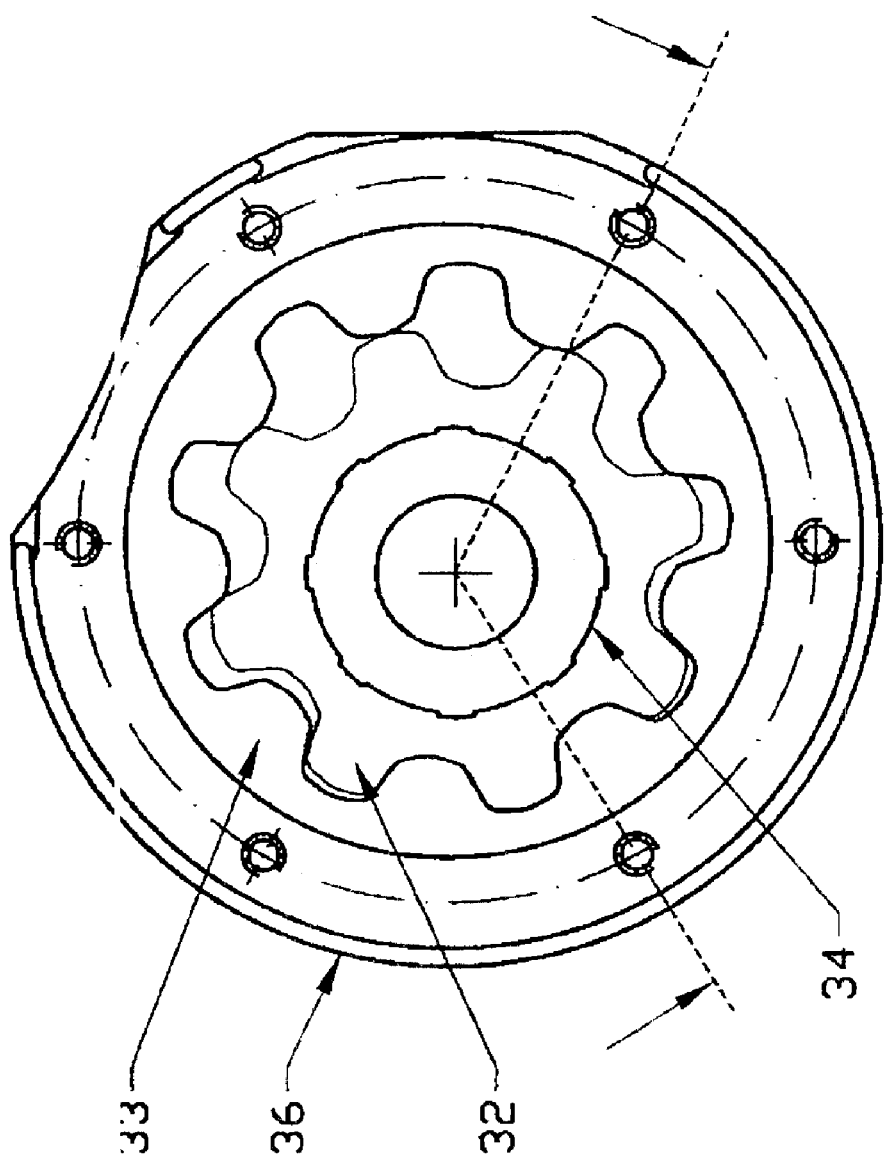
FIG. 8 is an end view of an oil pump of the geared type and of known design.

The aforementioned disadvantages to existing locations of an oil pump 24 may be overcome by relocating the oil pump directly in front of a reverse intermediate gear 19; that is to say, between the reverse intermediate gear 19 and a reverse gear shaft lug 22. This is shown in FIG. 7. According to the exemplary embodiment shown in FIG. 7, the oil pump 24 is of an internal geared type. This type of oil pump is shown in more detail in FIG. 8. The rotating parts of such a pump comprise two pieces; an inner rotor 32 and an outer rotor 33 eccentrically mounted in relation thereto. The inner rotor 32 has external teeth, which mesh with internal teeth on the outer rotor 33. The inner rotor 32 has a hole in its center through which a shaft runs. According to the invention the shaft is represented by the reverse gear shaft 20 (see FIG. 7). The hole in the inner rotor 32 also has internal splines or keys 34, which fit into corresponding keys on a projection 35 on the reverse intermediate gear 19. The oil pump 24 is therefore driven by the reverse intermediate gear 19.

Figure 1:
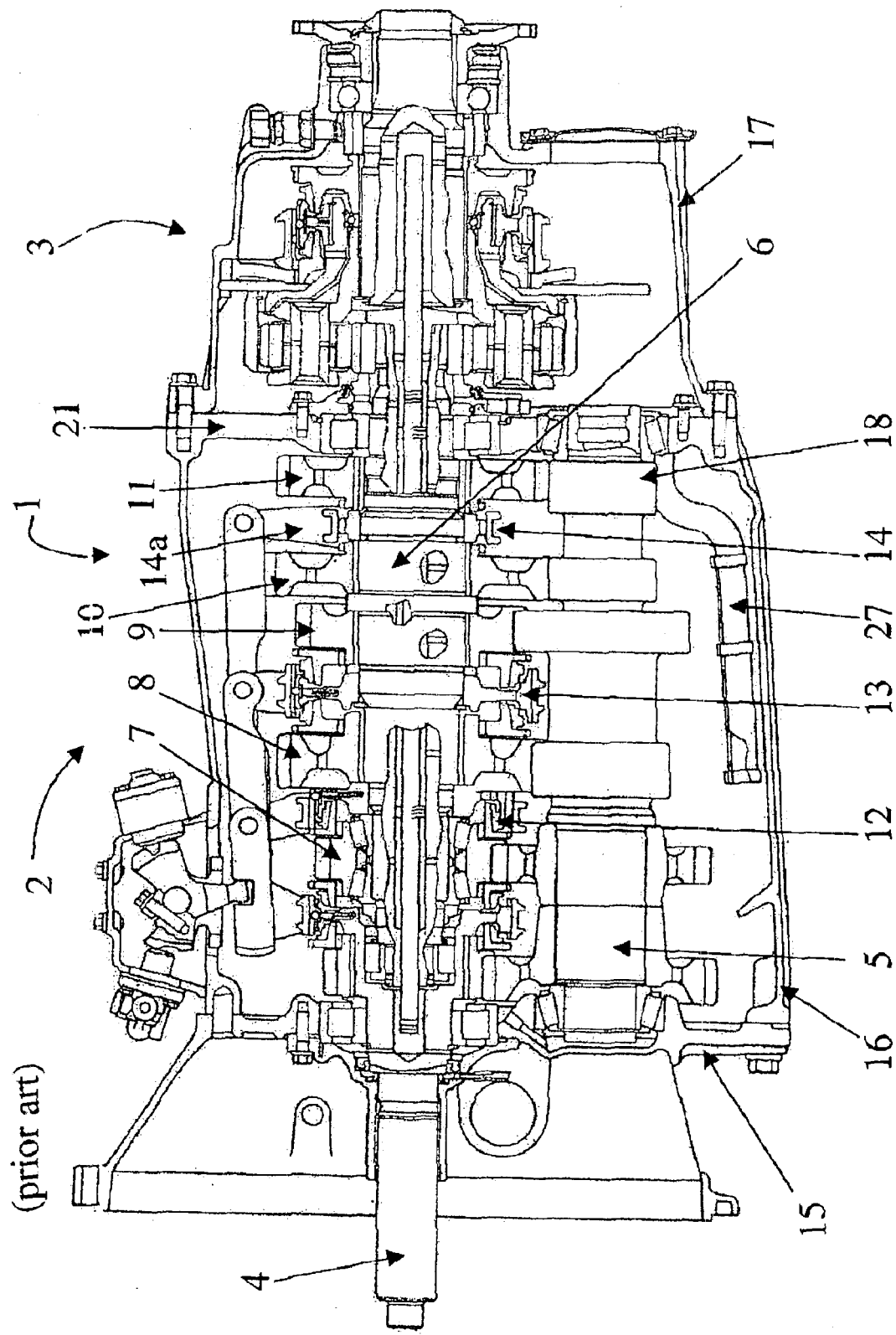
FIG. 1 is a longitudinal cross-section taken through a gearbox having a range transmission of known design.
Figure 2B:
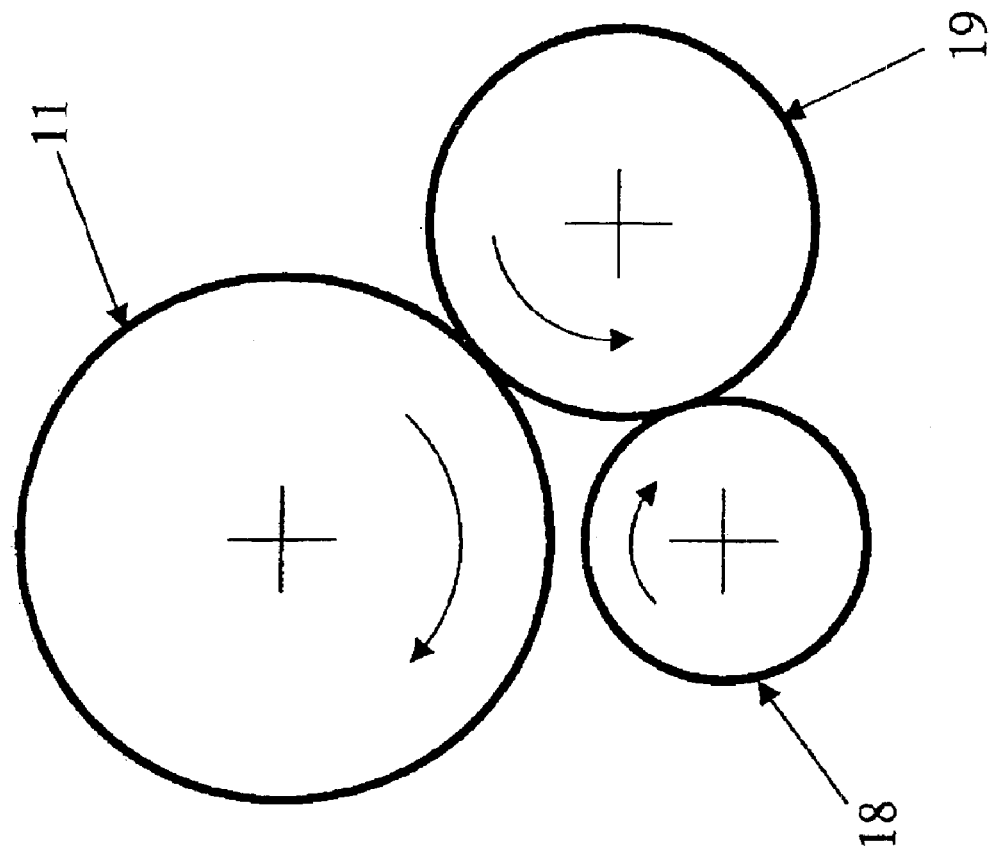
FIG. 2b is a diagrammatic cross-section through gears constituting reverse gears of known design.
Figure 2A:
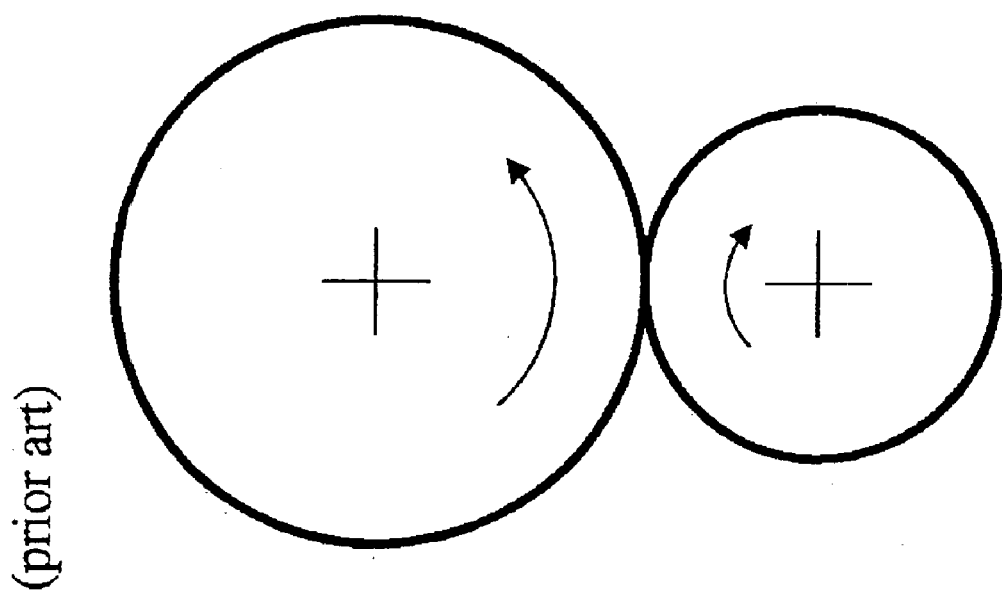
FIG. 2a is a diagrammatic cross-section through gears constituting forward gears of known design.
Figure 3:
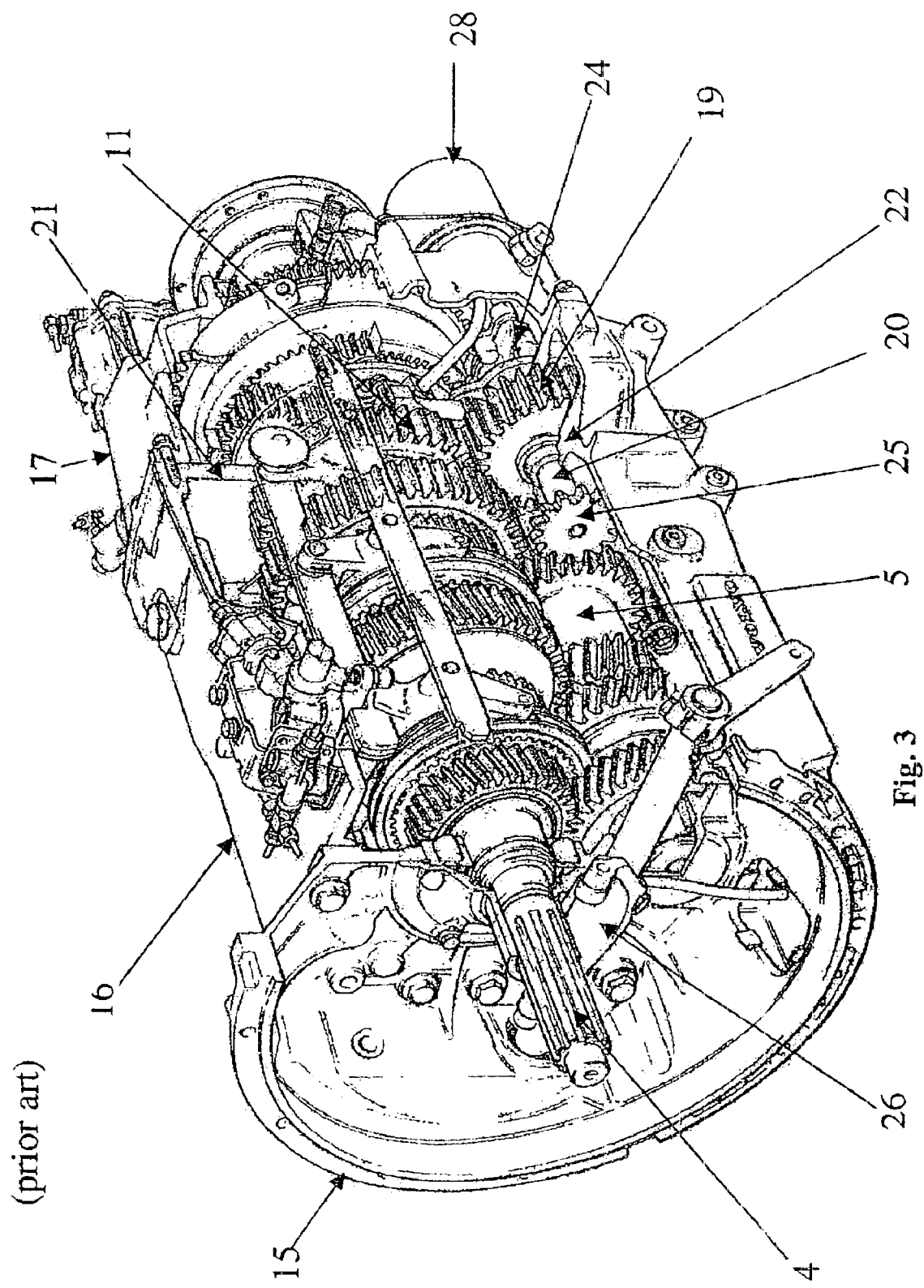
FIG. 3 is a perspective, shown in partial cut-away of the gearbox of FIG. 1.

As stated, the oil pump 24 is located directly in front of the reverse intermediate gear 19, which is to say essentially in the same axial position as the reverse gear toothed clutch 14 (see FIG. 1). It has been pointed out above that there is relatively good radial space just in this axial position. The pump 24 therefore does not come into conflict with gears and other items on the intermediate shaft 5 or the main shaft 6. It is also possible to locate the toothed clutch devices 14 for the reverse gear behind, that is to say to the right of the gear 11 for the reverse gear on the main shaft 6. In such cases it may be advantageous to locate the oil pump 24 behind the reverse intermediate gear 19.

Figures 4A, 4B:
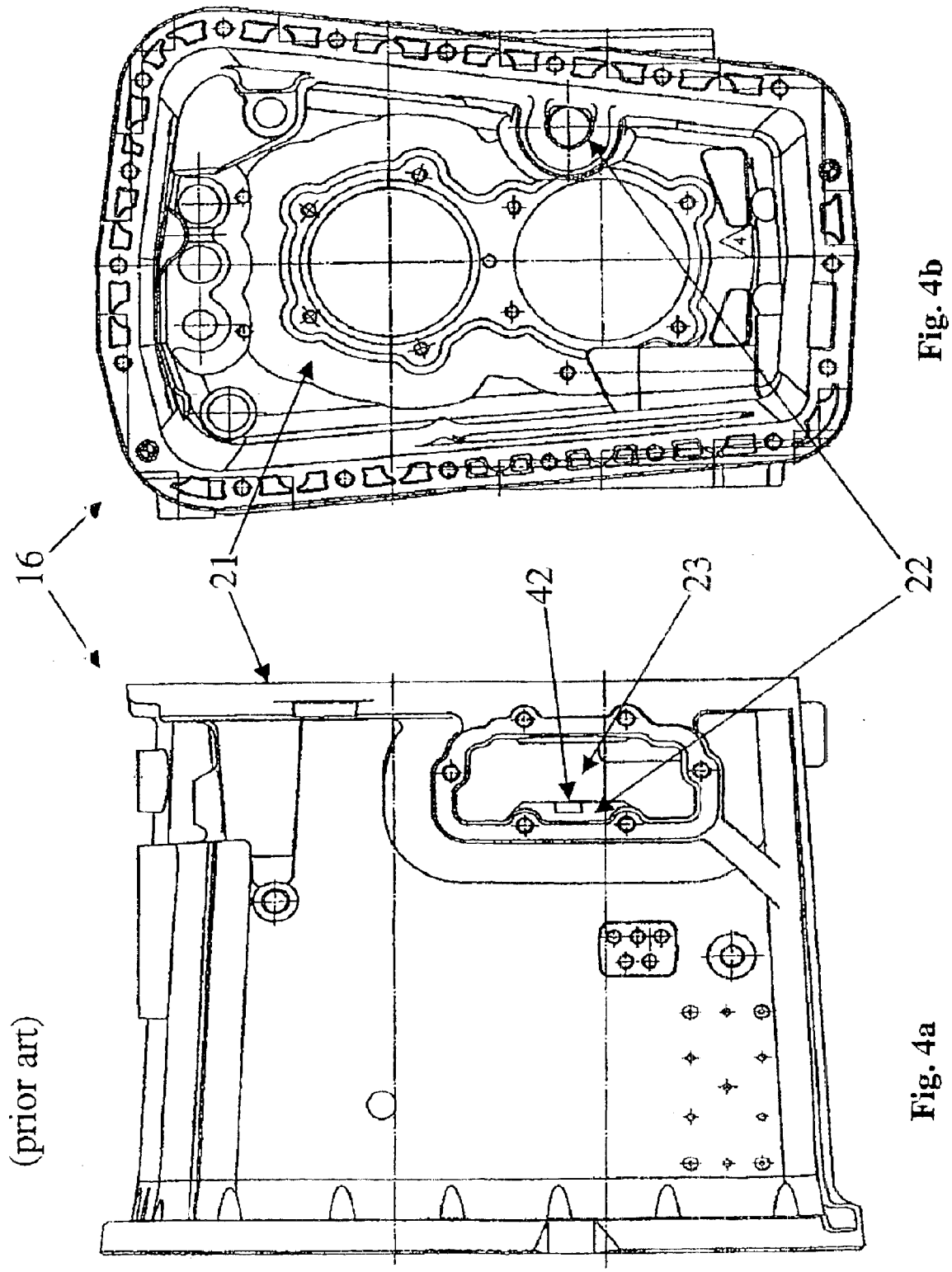
Figure 5:
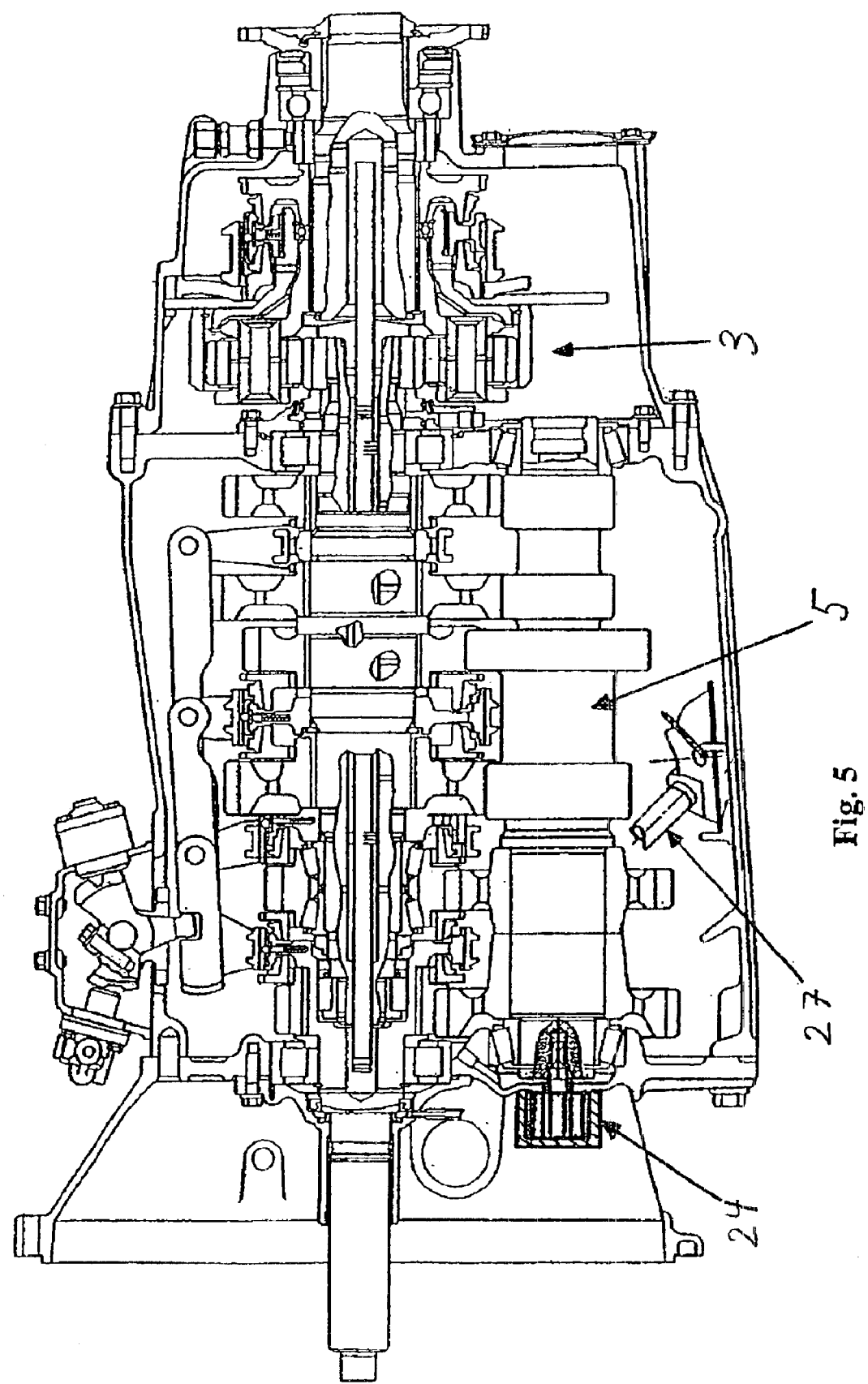
FIG. 5 is a cross-sectional view taken through a gearbox similar to that of FIG. 1, but with an alternative location of the lubrication device.

Returning to FIGS. 7 and 8, the inner rotor 32 and the outer rotor 33 are seated in the oil pump 24, preferably in a cast pump housing 36 which is covered by a bolted-on cover 37 (not shown in FIG. 8). Pump housing 36, cover 37, the inner rotor 32 and the outer rotor 33 then constitute a pre-assembled unit, generally referred to as the oil pump 24. This unit is then assembled with the reverse intermediate gear 19 and needle bearings 38 of the reverse intermediate gear 19 and possibly a disk 39. When assembling, all this is inserted through the opening 23 in the basic transmission casing 16 (see FIGS. 4a and 10b). The reverse gear shaft 20 is then inserted from the rear; that is to say, from the range transmission side. The reverse gear shaft 20 is pre-tensioned against the reverse gear shaft lug 22 in that it is provided with threads 40 at one end, or alternatively by means of a separate bolt. The oil pump 24 is thereby firmly clamped to the reverse gear shaft lug 22, while at the same time being guided radially by the reverse gear shaft 20. The same device that fixes the reverse gear shaft 20 in the basic transmission casing 16 is therefore used to fix the oil pump 24.

A projection 41 on the pump housing 36 fits into a corresponding recess 42 in the edge around the opening 23 in the basic transmission casing 16 (see FIGS. 7 and 10b). In this way, the pump 24 is also angularly fixed; that is to say, rotationally fixed. Both the projection 41 and the recess 42 can be formed in the casting (or a corresponding method of manufacture) of the pump housing 36 and the basic transmission casing 16. In this way no additional components or machining are required in order to achieve angular fixing of the oil pump 24.

The pump housing 36 can be suitably manufactured in aluminum. This material is relatively pliable and light in comparison to hardened and tempered steel (from which gears and shafts are usually manufactured). A disk 39 may therefore be required in order to distribute the clamping force when the reverse gear shaft 20 is pre-tensioned against the reverse gear shaft lug 22. Furthermore, the material in the pump housing 36 may have insufficient resistance to wear. For this reason it is advisable to make the outside diameter of the disk 39 large enough to enable the disk 39 to limit the forward axial movement of the reverse intermediate gear 19 (to the left in FIG. 7). The disk 39 thereby assumes two functions; that is to say, it distributes the clamping force and guides the reverse intermediate gear 19 axially.

The embodiment of the invention configured according to FIGS. 9a, 9b and 10a demonstrates the reverse gear shaft lug 22 and part of the gearbox casing. The embodiment according to FIG. 9a shows that no separate suction pipe (inlet duct to the oil pump 24) is needed if the reverse gear shaft lug 22 is enlarged downwards (also downwards in FIG. 9a) towards the bottom of the basic transmission casing 16, so that a suction duct 43 can be incorporated. FIG. 9b shows such a reverse gear shaft lug 22 viewed from the front; that is to say, viewed from the left in FIG. 9a. FIG. 10a shows the reverse gear shaft lug 22 viewed from behind; that is to say, viewed from the right in FIG. 9a. The suction duct 43 may be formed by a rod-shaped casting tool in the casting of the basic transmission casing. It can also be drilled after casting. In both cases, after manufacturing, there is a hole in the bottom of the basic transmission casing 16. This hole must be sealed in operation, for example by a plug 44. In order, as far as possible, to prevent the suction duct 43 from drawing in air, its inlet 45 should be located as low down as possible. This means that the plug 44 can also be used for changing oil when used oil must be drawn off. No separate oil change plug is therefore required. When assembling the gearbox, a suction strainer 46 may be inserted in the suction duct 43, from below, through the hole for the plug 44, and held in place by the plug 44.

The enlarged reverse gear shaft lug 22 necessitated by the ducts 43 and 47 also affords the advantage that the basic transmission casing 16 is made more rigid.

The outlet duct 47 from the oil pump 24 is also integrated into the basic transmission casing 16 as a cast or drilled duct.

From the suction duct 43, there is a hole 48 to the rear plane 49 of the reverse gear shaft lug 22, against which the pump 24 is pressed. The oil flow is led from the suction duct 43 via the hole 48 to the oil pump 24. Fitting against the hole 48, the pump housing 36 has ducts which carry the oil flow into the pump elements 32, 33. Similarly there is a hole 50 which leads the oil flow from the pump 24 to the outlet duct 47.

Figure 6:
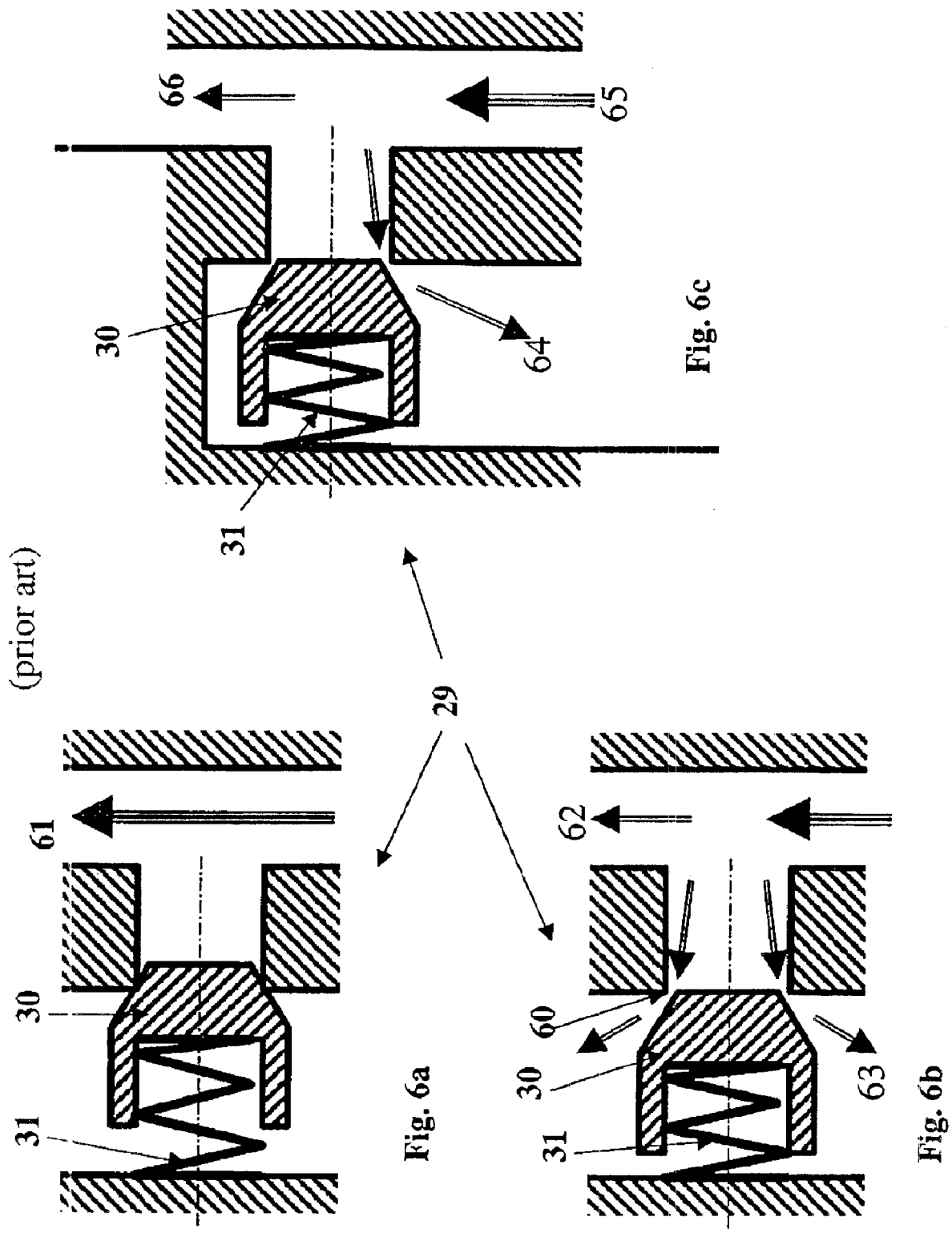
FIGS. 6a, 6b and 6c are diagrammatic representations of a pressure limiting valve of known design forming part of a lubrication system.

The suction duct 43 and the outlet duct 47 are somewhat staggered in relation to one another in the axial direction of the gearbox. The suction duct 43 is extended so that it just intersects the outlet duct 47. A pressure limiting valve 29 of the type described above is arranged at the point of intersection (see FIGS. 6a, 6b and 6c). A hole 51 is situated between the outlet duct 47 and the extension of the suction duct 43. A spring 31 presses a cone 30 against a seat at the transition between the hole 51 and the extension of the suction duct 43. The cone 30 and the spring 31 are kept in place by a holder 52.

The outlet duct 47 carries the oil flow from the reverse gear shaft lug out to the side of the basic transmission casing 16 (se FIGS. 9b and 10a). The oil flow must then be carried to a third cast or drilled duct 53 in the wall 21 in the basic transmission casing 16 for onward transmission to the lubricating oil consumers (see FIG. 10b). Use is therefore made of the cover 54 which covers the opening 23 for the reverse intermediate gear 19 (see FIGS. 11a and 11b). There are ducts provided for this purpose in the cover 54 and/or between the cover 54 and the basic transmission casing 16. No separate piping or the like is needed in order to carry the oil flow between the ducts 47 and 53 since the ducts are integrated into the cover 54.

An oil filter 28 is arranged in the cover 54 (see FIG. 11a). No separate housing is then required for the oil filter. A cover shield 55 on the underside of the cover 54 holds the filter 28 in place and at the same time permits oil filter changing.

The oil flow is therefore led from the outlet duct 47 to a duct 56 arranged directly opposite in the cover 54. The lubricating oil then flows through the filter 28, normally radially inwards towards the center of the oil filter, and on upward through a duct 57. The lubricating oil then continues into a space 58 between the cover 54 and the basic transmission casing 16 before it reaches the duct 53.

If the oil filter 28 should become completely clogged for any reason, an overflow valve 59 of the type described earlier is arranged in the cover. The purpose of the overflow valve 59 is to carry the oil flow past the filter 28 should the filter 28 become clogged.

Since the oil, according to the embodiment described above, is led outside the actual basic transmission casing 16, it will be exposed to a cooling effect from the passing air flow when the vehicle is in motion. This is advantageous with regard to the life of the gearbox, since an oil that is too hot has inferior lubrication properties. With the oil filter 28 located in the cover 54, a larger cooling surface is obtained, which makes this embodiment particularly advantageous.

The device according to the invention is not limited to the aforementioned embodiments. For example, without departing from the scope of the following claims the oil pump may be of a type other than the geared type.

What is claimed is:

1. A lubrication arrangement for a stage-geared gearbox configured to be arranged in a motor vehicle, said arrangement comprising:

a gearbox (1, 2) having an input shaft (4), an intermediate shaft (5) supported in a casing (15, 16, 21) and having at least one gear meshing with a gear on the input shaft (4);

a main shaft (6) supported in the casing (16, 21) and having gears (7, 8, 9, 10) meshing with gears on the intermediate shaft, at least one gear in each pair of intermeshing gears on the intermediate shaft and the main shaft being rotatably supported on the respective shaft and lockable to that shaft (4, 5, 6) by means of clutch members (12, 13, 14);

at least one gear (11, 18) located on each of the intermediate shaft (5) and the main shaft (6) configured for providing reverse gears;

a reverse gear shaft (20) supported in at least two bearing points (16, 21, 22) in the casing (21, 22), a reverse intermediate gear (19) arranged on the reverse gear shaft (20) between said bearing points (16, 21, 22), the reverse intermediate gear (19) meshing with said two corresponding gears (11,18) for establishing reverse gears; and a lubrication device comprising a lubricant pump (24), said lubricant pump (24) being arranged between the said bearing points (16, 21, 22) for the reverse gear shaft (20).

2. The lubrication arrangement as recited in claim 1, wherein at least one of the bearing points for the reverse gear shaft (20) is a reverse gear shaft lug (22) that is fixed in the casing (16).

3. The lubrication arrangement as recited in claim 1, wherein the reverse intermediate gear (19) is drivingly interconnected with the lubricant pump (24).

4. The lubrication arrangement as recited in claim 1, further comprising:

a suction strainer (46) arranged in a first duct (43, 48) for delivering lubricant to the lubricant pump (24), the first duct and a second duct (47) configured to take lubricant from the lubricant pump (24) and being arranged in the reverse gear shaft lug (22).

5. The lubrication arrangement as recited in claim 1, further comprising:

a pressure limiting valve (29, 30, 31) arranged in the reverse gear shaft lug (22), the pressure limiting valve interconnecting the said first-duct (43, 48) and second duct (47) when in an open configuration.

6. The lubrication arrangement as-recited in claim 1, further comprising:

a wall of the casing (16) has an opening (23) in connection with the lubricant pump (24) and the reverse intermediate gear (19), the opening (23) being covered by a cover (54), said cover (54) being arranged about a lubricant filter (28) and a third duct (56) for delivering lubricant to the lubricant filter (28) and a fourth duct (58) for taking lubricant from the lubricant filter (28).

7. The lubrication arrangement as recited in claim 1, further comprising:

an overflow valve (59) arranged in the cover (54), the overflow valve (59) connecting said third duct (56) and fourth duct (58) when in an open configuration.

8. The lubrication arrangement as recited in claim 4, wherein the second duct (47) and the third duct (56) are connected to one another and the fourth duct (58) is connected to ducts (53) that carry lubricant to various lubricant consumers in the gearbox (1, 2, 3).

9. The lubrication arrangement as recited in claim 1, wherein that the gearbox (1, 2) comprises a range transmission (3) coupled to the main shaft (6).

* * * * *